United States Patent
Chiu

(10) Patent No.: US 12,294,665 B2
(45) Date of Patent: May 6, 2025

(54) METHOD OF SECURING AUTHENTICITY AND EVIDENTIARY STATUS OF VIDEO RECORDING, TERMINAL DEVICE, AND COMPUTER READABLE STORAGE MEDIUM APPLYING THE METHOD

(71) Applicant: HON HAI PRECISION INDUSTRY CO., LTD., New Taipei (TW)

(72) Inventor: Chun-Wei Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 349 days.

(21) Appl. No.: 17/748,269

(22) Filed: May 19, 2022

(65) Prior Publication Data

US 2023/0056090 A1 Feb. 23, 2023

(30) Foreign Application Priority Data

Aug. 17, 2021 (CN) .......................... 202110945069.1

(51) Int. Cl.
*H04L 9/32* (2006.01)
*G06V 20/40* (2022.01)
*H04L 9/00* (2022.01)

(52) U.S. Cl.
CPC ............ *H04L 9/3297* (2013.01); *G06V 20/46* (2022.01); *H04L 9/50* (2022.05)

(58) Field of Classification Search
CPC ..... H04L 9/3297; H04L 9/50; H04L 2209/84; G06V 20/56
See application file for complete search history.

(56) References Cited

U.S. PATENT DOCUMENTS

| 2008/0229113 A1* | 9/2008 | Yagawa | H04L 9/3297 |
| | | | 713/189 |
| 2021/0344498 A1* | 11/2021 | Perunov | H04L 63/08 |
| 2022/0038292 A1* | 2/2022 | Yang | H04L 9/321 |

FOREIGN PATENT DOCUMENTS

| CN | 106503721 A | * | 3/2017 | |
| CN | 109819278 A | * | 5/2019 | |
| CN | 111460526 A | | 7/2020 | |
| CN | 109040781 B | * | 4/2021 | ........... G06Q 30/018 |
| WO | WO-2021208952 A1 | * | 10/2021 | ......... G06F 16/2255 |

* cited by examiner

*Primary Examiner* — Alexander Lagor
*Assistant Examiner* — Lydia L Noel
(74) *Attorney, Agent, or Firm* — ScienBiziP, P.C.

(57) ABSTRACT

A method of labeling video to provide authentication acquires an instruction to apply timestamp labeling. Each recorded video is labeled with a timestamp based on the instruction. The first mark information is generated based on a content of each recorded video as a hash value and is uploaded into a blockchain. Second mark information is generated based on a content of at least one video under investigation. By comparing the first mark information and the second mark information, a video under investigation is found to be undistorted and authentic when the first mark information is the same as the second mark information. The video under investigation is found to be non-authentic when the first mark information is different from the second mark information. A terminal device and a computer readable storage medium applying the method are also disclosed.

14 Claims, 9 Drawing Sheets

METHOD OF SECURING AUTHENTICITY AND EVIDENTIARY STATUS OF VIDEO RECORDING, TERMINAL DEVICE, AND COMPUTER READABLE STORAGE MEDIUM APPLYING THE METHOD

FIELD

The subject matter herein generally relates to imaging, and reliability of videos.

BACKGROUND

Video recordings of daily life of persons may be private data. Videos captured by an automobile data recorder in a vehicle may be used as evidence to determine the liability. However, the videos can be tampered with, thus losing authenticity of the videos.

Securing the authenticity of video data requires an improvement.

BRIEF DESCRIPTION OF THE DRAWINGS

Implementations of the present disclosure will now be described, by way of example only, with reference to the attached figures.

DETAILED DESCRIPTION

Figure 1:
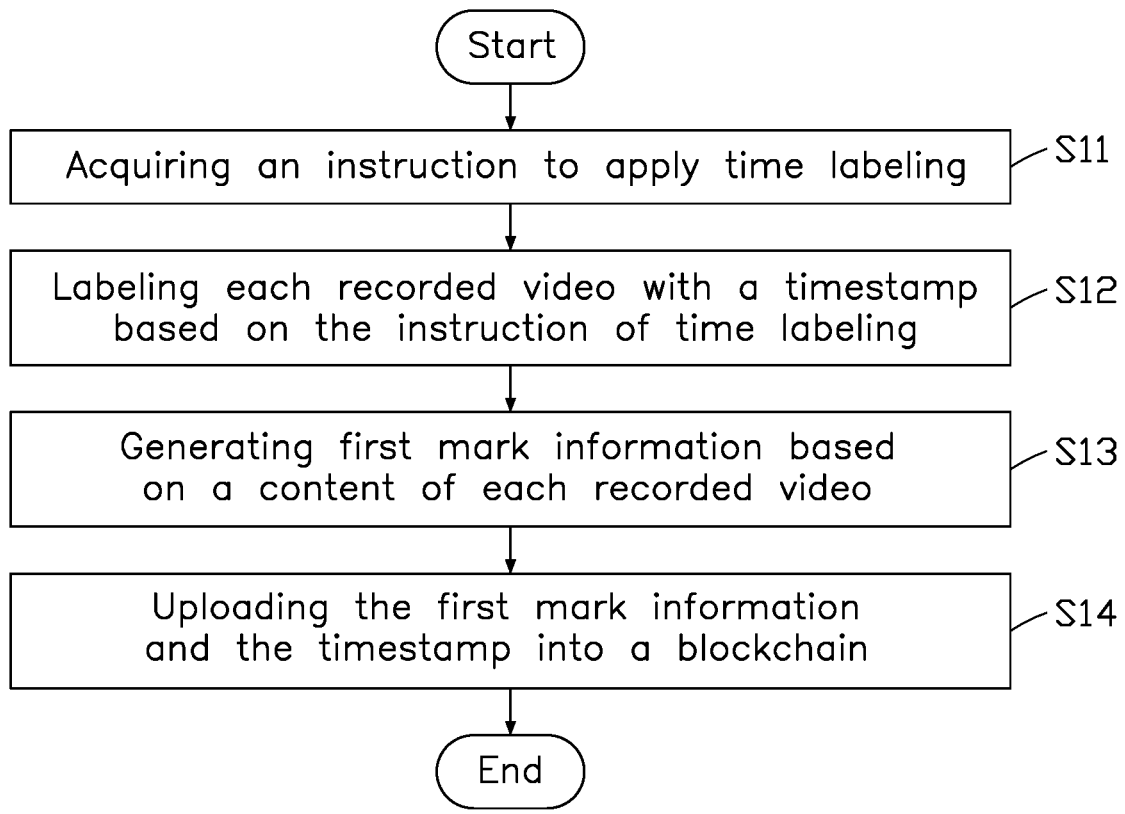
FIG. 1 is a flowchart illustrating an embodiment of a method of applying security labels to video data according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

In some scenarios, a video capturing device captures videos and stores the video as data. The stored videos can serve as evidence in a Court.

For example, when an accident occurs on a road, the videos captured by an automobile data recorder of a vehicle are stored in a memory card. Thus, the video data can serve as evidence for determining a responsibility of the accident.

The video can be tampered with, the tampered video does not represent the truth of the facts. Thus, a reliability of the video needs to be confirmed beforehand.

Based on the above situation, the present disclosure provides a method of applying labels to the video. The method can determine whether the video stored in a video capturing device is authentic. Only an undistorted or authentic video should be used as evidence.

FIG. 1 shows the method of labeling the video. The method includes the following steps. These steps may be re-ordered.

In block S11, an instruction to apply time labeling is obtained.

Figure 8:
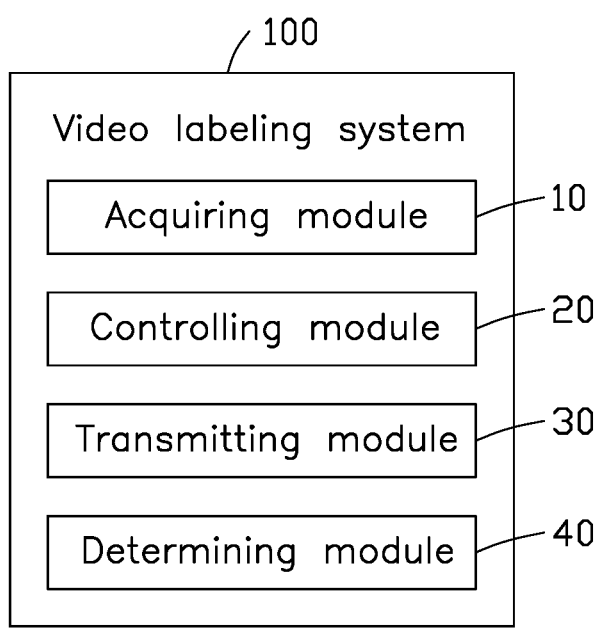
FIG. 8 is a diagram illustrating an embodiment of a system for applying labels to video data according to the present disclosure.

A video capturing device 80 (as shown in FIG. 8) operates in a normal state for capturing a video. When a special situation occurs, an importance of the current video is high, which can serve as evidence. The instruction of time labeling can be generated and transmitted to the video capturing device 80 or such instruction can be a constant and default command in the case of video capturing devices 80 used by the Police for example. The video capturing device 80 labels the current video with a special mark or executes a special process of the current video.

Figure 2:
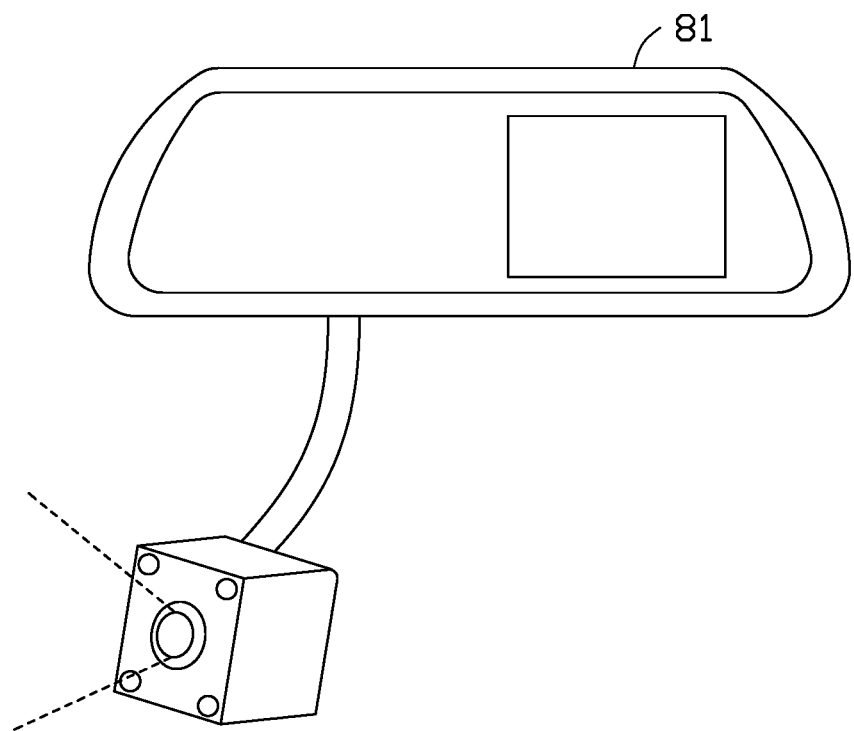
FIG. 2 is a diagram illustrating an embodiment of an application environment of the method of FIG. 1 according to the present disclosure.

As shown in FIG. 2, the video capturing device 80 can be an automobile data recorder 81. There can be an accident on the road (a special situation). Drivers can send a voice command for generating the time labeling instruction, thus the automobile data recorder 81 executes a special process of the current video.

For example, the video capturing device 80 can be a security camera. The special situation can be a gathering of peoples in a monitored region (another special situation). The time labeling instruction can be generated by a pressing predefined key on a master console. When a gathering of peoples in the monitored region is to take place for example, a user of security camera monitors can press the predefined key for generating the time labeling instruction for controlling the security camera to execute the special process of the current video.

In some embodiments, the time labeling instruction is manually generated, such as a voice or a key pressed by the user. In some embodiments, the time labeling instruction is automatically generated by a master console system connected with the video capturing device 80.

For example, the video capturing device 80 can be a security camera with a body recognition function and a function of counting. The security camera connects with the master console system. When the special situation is gathered peoples in a monitoring region. When the number of the people in the monitoring region exceeds a preset value, the security camera identifies that the people are gathered and sends a signal to the master console system, the master console system outputs the time labeling instruction based on the received signal for controlling the security camera to execute a special process of the current video.

In block S12, the current video is labeled with a timestamp in time based on the obtained time labeling instruction.

There can be several videos stored in the video capturing device 80. Each video records for a preset time period. For example, a time duration of each video stored in the automobile data recorder 81 can be three minutes. When a recording time of the video reaches three minutes, the video is independently stored in the memory card or a storage medium of the video capturing device 80.

The time of obtaining the time labeling instructions is a time of recording the video, and the timestamp is used for recording the time of outputting the time labeling instructions.

In some embodiments, the timestamp is an official time of the position of the video capturing device 80 recording the current video. For example, the video capturing device 80 can be an automobile data recorder 81. The content of the timestamp can be the official time of a place of the recorded video captured by the video capturing device 80 when the user generates the voice instruction of the labeling to the video capturing device 80.

In some embodiments, the content of the timestamp can be a time node in the re-ordered video. For example, each video clip stored by the video capturing device 80 is three minutes long, a predefined time node in the recorded video is obtained based on the time labeling instruction, such as two minutes and thirty-three seconds. The content of the timestamp can thus be 0233.

Figure 3:
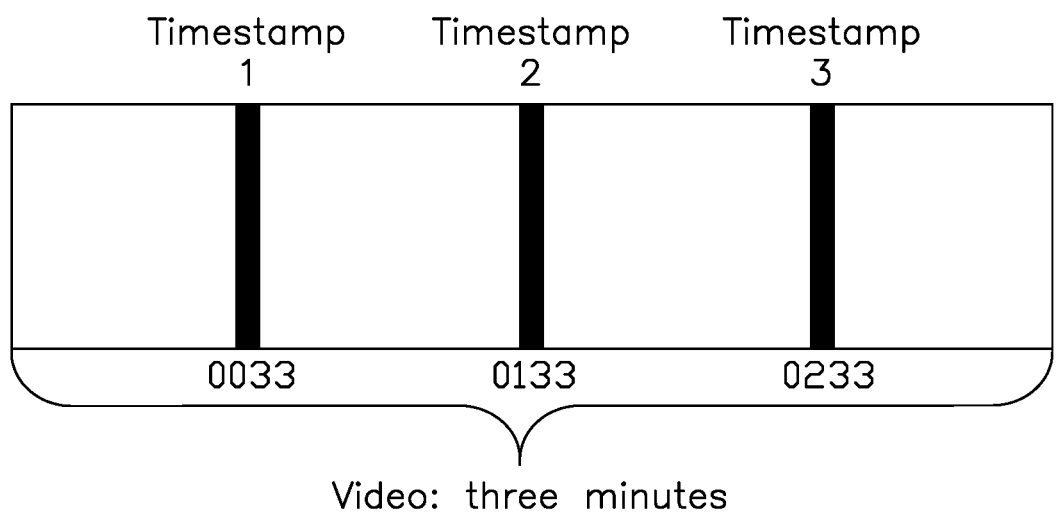
FIG. 3 is a diagram illustrating an embodiment of timestamps as labels according to the present disclosure.

As shown in FIG. 3, each video can include one or more timestamps.

For example, one video three minutes long corresponds to three timestamps. The time nodes of the three timestamps can be thirty-three seconds, one minute and thirty-three seconds, and two minutes and thirty-three seconds, the corresponding contents of the three timestamps are respectively 0033, 0133, and 0233.

The generated timestamps can be buffered in the video capturing device 80. In some embodiments, the generated timestamps and the recorded video can be stored in the same storage medium, such as a memory card of the automobile data recorder 81. In some embodiments, the generated timestamps and the recorded video are separately stored in different storage mediums, for example, the generated timestamps are stored in the memory card of the automobile data recorder 81, and the recorded video are stored in the storage medium.

In block S13, a first mark information is generated based on the content of the video.

The content of each video is different each other, thus each video corresponds to different first mark information.

For example, the first mark information can be a hash value. The hash value is a string with a small amount of data in a predefined format by compressed the video data through a hash function. The hash value includes several random letters and several random values. By computing all of the data of the recorded video, the corresponding hash value is obtained. The computing algorithm can be Sha252sum algorithm, or Md5sum algorithm, not being limited thereto.

The recorded videos are stored as data in the video capturing device 80. Due to different content of the videos, the data of each recorded video is different, and the computed hash values are therefore also different.

In block S14, an identification document (ID), the first mark information, and the timestamp of the video are uploaded into a blockchain.

In one embodiment, each video has a unique ID, and the ID remains unchanged when the content of the video changes. The ID can be a string or numbers.

The videos without the timestamp can exist in the video capturing device 80. Therefore, it is determined whether or not the video include a timestamp before uploading into the blockchain. When the video includes the timestamp, the corresponding ID, the corresponding first mark information, and the corresponding timestamp of the same video are uploaded into the blockchain. If the video data does not include a timestamp, the corresponding ID and the first mark information of the same video are uploaded into the blockchain.

The blockchain is a database and includes a string of data blocks related to each other through a cryptography method. Each data block includes information of a network transaction for verifying a validity of the information and generating a next data block, the hash value of the next data block will contain the unique hash value of the preceding data block. The blockchain is decentralized and tamper-resistant. Once the information is uploaded into the blockchain, the information can be taken as authentic and permanently stored.

In one embodiment, the ID, the first mark information, and the timestamp of the same video can be stored in a same data block, or in different data blocks related to each other, not being limited thereto.

The ID, the first mark information, and the timestamp of the same video are related to each other, the users can search for the corresponding first mark information and the corresponding timestamp based on the block number or block position of the ID in the blockchain.

In one embodiment, after the video is recorded and processed, the ID, the corresponding first mark information, and the corresponding timestamp are uploaded. For example, in the automobile data recorder 81, each video is three minutes long, when three minutes pass, data of such a video clip is formed, and the corresponding ID, the corresponding first mark information, and the corresponding timestamp are uploaded into the blockchain.

In some embodiments, the ID, the first mark information, and the timestamp are uploaded into the blockchain through a smart contract. The smart contract is a computer protocol in blockchain technology. The smart contract ensures that the data in the blockchain is tamper-resistant.

In one embodiment, the first mark information of the video uploaded into the blockchain due to the steps S11-S14 can be viewable and unchangeable. Therefore, the steps S11-S14 can be defined as a preserving evidence step.

Figure 4:
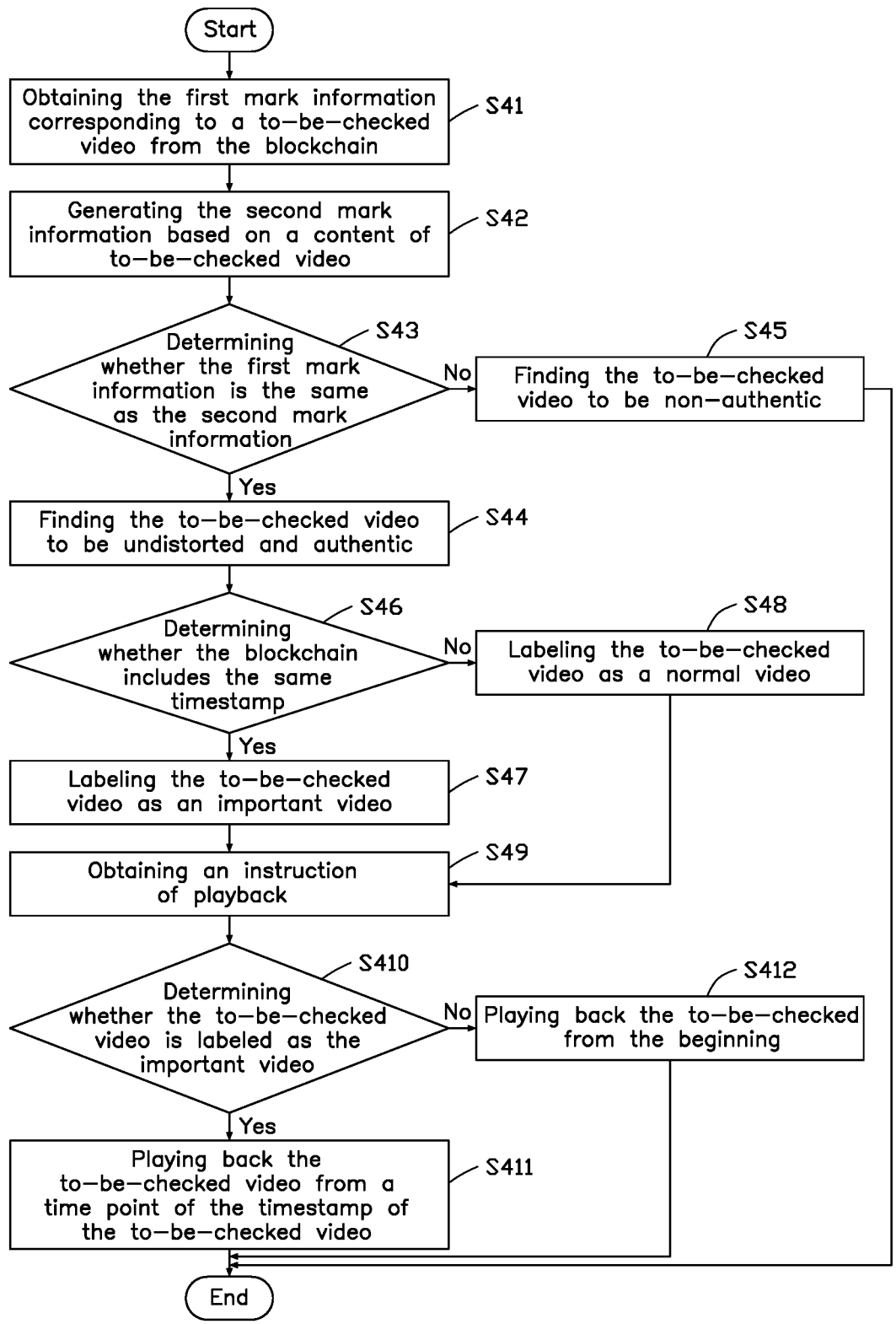
FIG. 4 is a flowchart illustrating an embodiment of a method after block 14 of FIG. 1 according to the present disclosure.

As shown in FIG. 4, after the step of the block S14, the method further includes:

In block S41, the first mark information corresponding to a video being investigated ("to-be-checked video") is obtained from the blockchain.

The to-be-checked video can be some recorded videos of a number or all recorded videos. In one embodiment, a time of executing a checking operation is not limited, and the number and the content of the to-be-checked video are also not limited.

Figure 5:
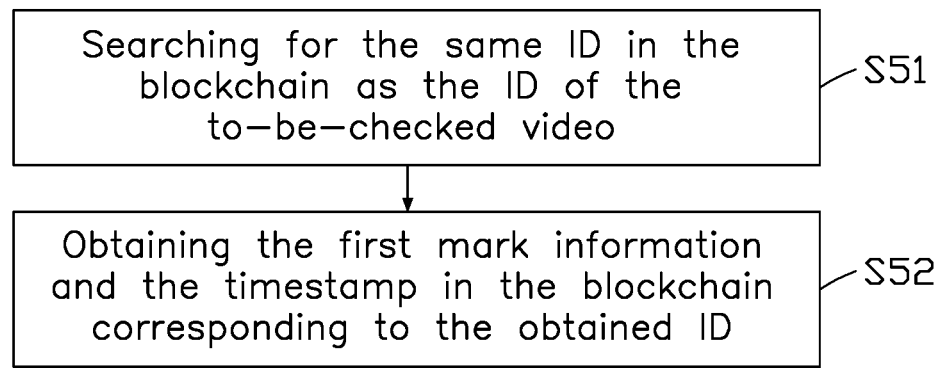
FIG. 5 is a detailed flowchart illustrating an embodiment of block S41 in FIG. 4 according to the present disclosure.

FIG. 5 shows a detail flowchart of the block S41.

In block S51, the same ID in the blockchain as the ID of the to-be-checked video is searched for.

Each recorded video corresponding to one ID is uploaded into the blockchain after the video is recorded. Thus, the ID can be used as a keyword search item while obtaining the stored position of the ID in the blockchain being same with the ID of the to-be-checked video.

In block S52, the first mark information and the timestamp in the blockchain corresponding to the obtained ID are obtained.

The first mark information, the ID, and the timestamp are uploaded into the blockchain at the same time. The first mark information, the ID, and the timestamp can be stored in a same data block or in different data blocks related with each other. Thus, when the position of the obtained ID is confirmed, the first mark information and the timestamp corresponding to the obtained ID can be obtained and downloaded.

In block S42, second mark information is generated based on the to-be-checked video.

Each to-be-checked video corresponds to one second mark information based on the content of the to-be-checked video. Different to-be-checked videos correspond to different second mark information's.

In one embodiment, the type of the second mark information is same as the type of the first mark information. For example, both the first mark information and the second mark information are hash values.

In some embodiments, while obtaining the first mark information from the blockchain, it is determined whether the blockchain includes the same timestamp as the timestamp of the to-be-checked video. When the blockchain includes the same timestamp, the timestamp in the blockchain is downloaded at the same time. When the blockchain does not include the same timestamp, only the first mark information is obtained.

In block S43, it is determined whether the first mark information is the same as the second mark information. When the first mark information is the same as the second mark information, the procedure goes to the block S44. When the first mark information is different from the second mark information, the procedure goes to the block S45.

In one embodiment, the first mark information is uploaded into the blockchain after the recorded video, thus the obtained first mark information from the blockchain corresponds to the original video corresponding to the to-be-checked video. If the to-be-checked video is the original and authentic video, the content of the to-be-checked video will be unchanged, and the first mark information will be the same as the second mark information. If the to-be-checked video has been tampered with, the content of the to-be-checked video will be different from the original video, and the first mark information will be different from the second mark information.

For example, when the first mark information and the second mark information are hash values, the hash value includes several random numbers and several random letters. When the to-be-checked video is not authentic, the numbers and the letters of the first mark information are different from those of the second mark information. When the to-be-checked video is undistorted and authentic, the first mark information is the same as the second mark information.

In block S44, the to-be-checked video is found to be undistorted and authentic, and the procedures goes to the block S46.

When the to-be-checked video is undistorted, the to-be-checked video can be used as legal evidence.

In block S45, the to-be-checked video is found to be non-authentic, and the procedure ends.

When the to-be-checked video is non-authentic, the to-be-checked video fails to objectively reflect actions in the recorded region and cannot be used as legal evidence.

In block S46, whether the blockchain includes the same timestamp as the timestamp of the to-be-checked video is determined. When the blockchain includes the same timestamp, the procedure goes to the block S47. When the blockchain does not include the same timestamp, the procedure goes to the block S48.

After the first mark information, the ID, and the timestamp are obtained at the above steps, and the question of whether an undistorted to-be-checked video includes a timestamp can be further determined. The to-be-checked video with the timestamp has a higher degree of reliability than the to-be-checked video without a timestamp. The to-be-checked video with the timestamp can be executed the special process.

In block S47, the to-be-checked video is labeled as an important video, and the procedure goes to the block S49.

The to-be-checked video with the timestamp has a higher reliability than the to-be-checked video without the timestamp, and the to-be-checked video with the timestamp can be labeled with a special mark, and can be conveniently searched for.

In block S48, the to-be-checked video is labeled as a normal video, and the procedure goes to the block S49.

The content of the to-be-checked video without the timestamp has a lower degree of reliability in a Court situation, and an importance of the to-be-checked video without the timestamp is lower than that of the to-be-checked video with the timestamp.

In block S49, an instruction of playback is obtained.

After determining authenticity of the to-be-checked video, the to-be-checked video can be played. When the to-be-checked video needs to be played back, the users can generate the instruction of playback. The manner of the instruction to playback is not limited.

After checking the to-be-checked video, the user can generate the instruction of playback based on a requirement for automatically playing the to-be-checked video. The instruction of playback can be generated in different ways, not being limited thereto.

For example, when the video capturing device 80 is the automobile data recorder 81, the instruction of playback can be a voice instruction of "playback" generated by the user, thus the to-be-checked video is played back based on the voice instruction of "playback".

In block S410, whether the to-be-checked video is labeled as an important video is determined. When the to-be-checked video is labeled as the important video, the procedure goes to the block S411. When the to-be-checked video is a normal video, the procedure goes to the block S412.

The important video has a higher reliability than the normal video, thus a process of playing back the to-be-checked video labeled as an important video can be different from other videos.

In block S411, the to-be-checked video is played back from a time point of the timestamp.

In the to-be-checked video, the time point of the timestamp is a start time point of the special situation. When playing the to-be-checked video from the timestamp, an important part of the to-be-checked video can be quickly found by a viewer, and a time of viewing the to-be-checked video is reduced.

In some embodiments, when there are several timestamps in the to-be-checked video, the earliest timestamp can serve as the time point of playing back the to-be-checked video.

For example, when the to-be-checked video is three minutes long, and there are three timestamps in the to-be-checked video, the contents of the three timestamps are 0033, 0133, and 0233. The time point of playing back the to-be-checked video is the thirty-three seconds stamp.

In block S412, the to-be-checked video is played back from the beginning.

In one embodiment, the steps of S41-S412 are used for checking the whole recorded video or several recorded videos stored in the video capturing device 80. Integrity of the to-be-checked videos are confirmed, thus some of the to-be-checked videos being original videos can be used as legal evidence, and some of the to-be-checked videos found to distorted fail to be legal evidence. The reliability of the video evidence is improved. Therefore, the steps of S41-S412 can be defined as a checking step.

In one embodiment, when a storing space of the video capturing device 80 is full, some of the recorded videos can be deleted.

Figure 6:
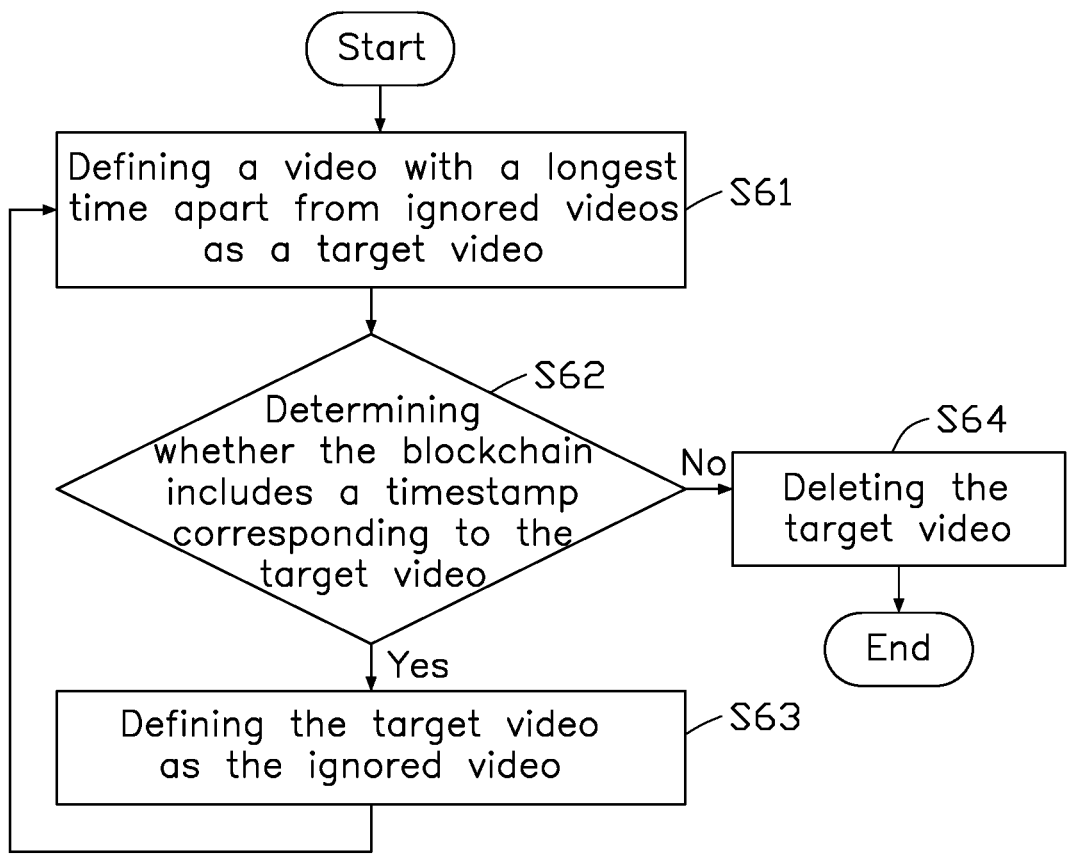
FIG. 6 is a flowchart illustrating an embodiment of a method after block S412 according to the present disclosure.

FIG. 6 shows further steps when the storage space of the video capturing device 80 is full.

In block S61, the video with a longest time apart from ignored videos is defined as a target video.

The ignored videos cannot be deleted no matter how full the storing space of the video capturing device 80 may be. The ignored videos can be videos with the timestamp. An importance of the target video with a longest time is reduced, thus the deletion of the target video is given a top priority.

In block S62, whether the blockchain includes a timestamp corresponding to the target video is determined. When the blockchain includes the timestamp corresponding to the target video, the procedure goes to the block S63. When the blockchain does not include the timestamp corresponding to the target video, the procedure goes to the block S64.

The target video which includes the corresponding timestamp can be used as evidence, thus the operation of determining whether the target video includes a corresponding timestamp needs to be confirmed before deleting the target video.

Figure 7:
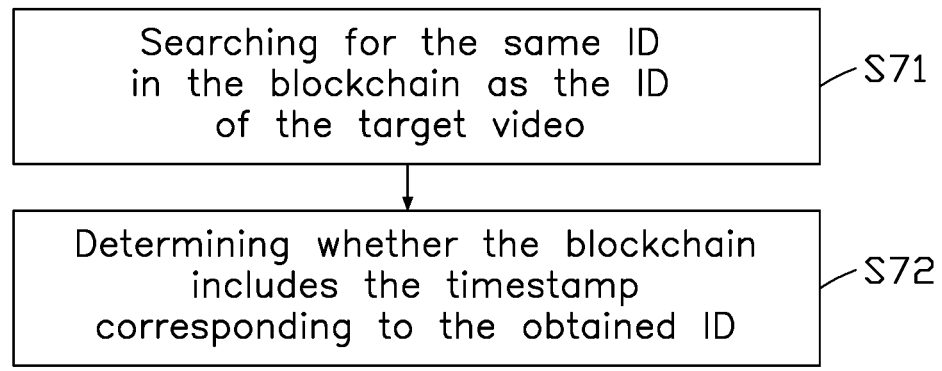
FIG. 7 is a detailed flowchart illustrating an embodiment of block S62 in FIG. 6 according to the present disclosure.

FIG. 7 shows the detail flowchart of the block S62.

In block S71, the same ID in the blockchain as the ID of the target video is searched for.

Each recorded video corresponding to one ID is uploaded into the blockchain after the video is recorded. Thus, the ID can be used as a keyword search item.

In block S72, whether the blockchain includes timestamp corresponding to the obtained ID is determined. When the blockchain includes the timestamp corresponding to the obtained ID, the procedure goes to the block S63. When the blockchain does not include the timestamp corresponding to the obtained ID, the procedure goes to the block S64.

The corresponding timestamp and the corresponding ID are uploaded into the blockchain at the same time, and the corresponding timestamp and the corresponding ID are stored in a same data block or in different data blocks related with each other. By searching the data block in the blockchain for the same ID as the target video, the corresponding timestamp can be further searched for in the same data block or another data block related to the data block with the ID corresponding to the target video, thus the operation of determining whether the target video has a corresponding timestamp is confirmed.

In block S63, the target video is defined as an ignored video, and the procedure returns to the block S61.

A possibility of the target video being used as evidence is checked, and the target video with a corresponding timestamp can be used as evidence, the target video with the corresponding timestamp thus needs to be retained.

In block S64, the target video is deleted.

The possibility of the target video without the corresponding timestamp being used as evidence is low, thus the deletion of the target video without the corresponding timestamp is given a top priority.

FIG. 8 shows a video labeling system 100. The video labeling system 100 includes an acquiring module 10, a controlling module 20, a transmitting module 30, and a determining module 40.

The acquiring module 10 is configured to obtain the instruction of time labeling.

The controlling module 20 is configured to generate a timestamp based on the instruction of time labeling and generate first mark information based on the content of the video.

The transmitting module 30 is configured to upload the ID, the timestamp, and the first mark information of the video into the blockchain, and further obtain the ID, the timestamp, and the first mark information of the video from the blockchain.

The controlling module 20 further generates second mark information based on the content of the to-be-checked video and compares the first mark information and the second mark information corresponding to the same ID.

The determining module 40 is configured to determine whether the to-be-checked video is authentic.

In some embodiments, functional modules in the video labeling system 100 disclosed above are only for illustration. In other embodiments, the functional modules in the video labeling system 100 can be divided into different modules according to requirements, so as to complete all or part of functions of the video labeling system 100.

For specific implementation of the modules of the present disclosure, refer to corresponding descriptions of the method in FIGS. 1-7.

The video labeling system 100 in FIG. 8 can determine whether the video stored in the video capturing device 80 is authentic or not, and the reliability of the video is improved.

Figure 9:
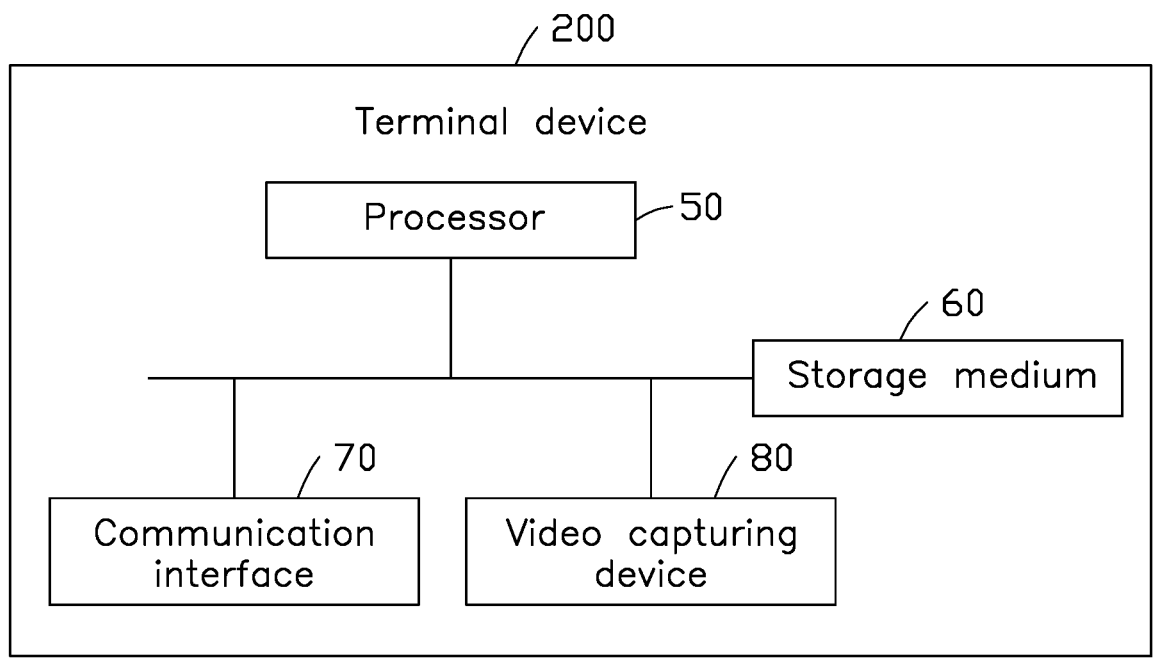
FIG. 9 is a diagram illustrating an embodiment of a terminal device according to the present disclosure.

FIG. 9 shows a structure of a terminal device 200.

The terminal device 200 includes the video labeling system 100 as recited above. The video labeling system 100 can refer to the description of the embodiment of FIG. 8 of the present disclosure.

The terminal device 200 further includes a processor 50, a storage medium 60, a communication interface 70, and a video capturing device 80.

The processor 50, the storage medium 60, the communication interface 70, and the video capturing device 80 are connected with each other through a bus, or directly connected.

The processor 50 can be a central processing unit (CPU), a microprocessors, digital signal processor (DSP), an application specific integrated circuit (ASIC), a field-programmable gate array (FPGA) or other programmable logic, a discrete gate or transistor logic, discrete hardware components, not being limited thereto.

The storage medium 60 can be a read-only memory (ROM) or a static storage device of another type which can store static information and instructions, a random access memory (RAM) or a dynamic storage device of another type which can store information and instructions, or can also be an electrically erasable programmable read-only memory (EEPROM), a compact disc read-only memory (CD-ROM) or other optical disc memories, optical disc memories (including a compact disc, a laser disc, an optical disc, a digital versatile disc, a BLU-RAY disc, and the like), a magnetic disk storage medium or other magnetic storage devices, or any other medium which can be used for carrying or storing expected program code in an instruction or data structure form and can be accessed by a computer, not being limited thereto. The storage medium 60 can be independent component connected with the processor 50 through the bus. The storage medium 60 can be embedded with the processor 50 together.

The communication interface 70 communicates with other devices or a communications network, such as an Ethernet, a radio access network (RAN), or a wireless local area network (WLAN), not being limited thereto.

The video capturing device 80 captures the video. The video capturing device 80 can be a security camera, a camera, an automobile data recorder, and other electronic devices with a function of video capturing.

The storage medium 60 stores program codes implementing solutions of the present disclosure, and the program codes implementing the solutions of the present disclosure are stored in the memory and controlled and implemented by the processor 50. The processor 50 implements the program codes stored in the storage medium 60. The program codes stored in the storage medium 50 can be executed to complete all or part of the method of FIGS. 1-7.

The terminal device 200 in FIG. 9 can label the video with timestamps and generate the first mark information and the second mark information. The terminal device 200 further uploads the timestamp, the first mark information, and the ID into the blockchain. The terminal device 200 also obtains the timestamp, the first mark information, and the ID from the blockchain. The terminal device 200 also compares the first mark information and the second mark information for determining whether the video is authentic and undistorted, and the reliability of the video is improved.

The present disclosure also provides a computer readable storage medium with computer programs. The computer programs are operated on the terminal device 200 for implementing the method of labeling video by the terminal device 200 of the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of labeling video, the method being applicable in a terminal device, the terminal device comprises a storage medium with computer programs and a processor; the processor executes the computer programs to implement the following steps:
    acquiring an instruction to apply time labeling, and labeling each recorded video with a timestamp based on the instruction of time labeling;
    generating first mark information based on a content of each recorded video and uploading the first mark information and the timestamp into a blockchain;
    generating second mark information based on a content of at least one to-be-checked video; the at least one to-be-check video is one or all of the recorded videos;
    determining whether the first mark information is the same as the second mark information;
    finding the to-be-checked video to be undistorted and authentic when the first mark information is determined to be the same as the second mark information;
    finding the to-be-checked video to be non-authentic when the first mark information is determined to be different from the second mark information;
    determining whether the blockchain comprises the same timestamp as the timestamp of the to-be-checked video; and
    labeling the to-be-checked video as an important video when the blockchain is determined to comprise the same timestamp;
    wherein the method further comprises:
    obtaining an instruction of playback;
    determining whether the to-be-checked video is labeled as the important video;
    playing back the to-be-checked video from a time point of the timestamp of the to-be-checked video when the to-be-checked video is determined to be labeled as the important video; and
    playing back the to-be-checked from beginning when the to-be-checked video is determined to be labeled as a normal video.

2. The method of claim 1, wherein an identification document (ID) of the recorded video is uploaded while uploading the first mark information and the timestamp into the blockchain.

3. The method of claim 2, wherein the method further comprises:
    searching for the same ID in the blockchain as the ID of the to-be-checked video; and
    obtaining the first mark information and the timestamp in the blockchain corresponding to the ID of the to-be-checked video.

4. The method of claim 1, wherein the method further comprises:
    deleting the recorded video with a longest time apart from ignored videos when a storing space of the recorded video is full.

5. The method of claim 4, wherein the step of deleting the recorded video with a longest time apart from the ignored videos when a storing space of the recorded video is full comprises:
    defining the recorded video with a longest time apart from the ignored videos as a target video;

determining whether the blockchain comprises a timestamp corresponding to the target video;
deleting the target video when the blockchain is determined to comprise a timestamp corresponding to the target video; and
defining the target video as the ignored video when the blockchain is determined to comprise the timestamp corresponding to the target video, and defining a new recorded video with a longest time apart from the ignored videos as the target video.

6. A terminal device comprises:
a storage medium; and
a processor,
wherein the storage medium stores computer programs, and
the processor executes the computer programs to implement the following:
  acquiring an instruction to apply time labeling, and labeling each recorded video with a timestamp based on the instruction of time labeling;
  generating first mark information based on a content of each recorded video and uploading the first mark information and the timestamp into a blockchain;
  generating second mark information based on a content of at least one to-be-checked video; the at least one to-be-check video is one or all of the recorded videos;
  determining whether the first mark information is the same as the second mark information;
  finding the to-be-checked video to be undistorted and authentic when the first mark information is determined to be the same as the second mark information;
  finding the to-be-checked video to be non-authentic when the first mark information is determined to be different from the second mark information;
  determining whether the blockchain comprises the same timestamp as the timestamp of the to-be-checked video; and
  labeling the to-be-checked video as an important video when the blockchain is determined to comprise the same timestamp;
wherein the processor further:
obtaining an instruction of playback;
determining whether the to-be-checked video is labeled as the important video;
playing back the to-be-checked video from a time point of the timestamp of the to-be-checked video when the to-be-checked video is determined to be labeled as the important video; and
playing back the to-be-checked from beginning when the to-be-checked video is determined to be labeled as a normal video.

7. The terminal device of claim 6, wherein an identification document (ID) of the recorded video is uploaded while uploading the first mark information and the timestamp into the blockchain.

8. The terminal device of claim 7, wherein the processor further:
  searching for the same ID in the blockchain as the ID of the to-be-checked video; and
  obtaining the first mark information and the timestamp in the blockchain corresponding to the ID of the to-be-checked video.

9. The terminal device of claim 6, wherein the processor further:

deleting the recorded video with a longest time besides ignored videos when a storing space of the recorded video is full.

10. The terminal device of claim 9, wherein the processor further:
  defining the recorded video with a longest time apart from the ignored videos as a target video;
  determining whether the blockchain comprises a timestamp corresponding to the target video;
  deleting the target video when the blockchain is determined to comprise a timestamp corresponding to the target video; and
  defining the target video as the ignored video when the blockchain is determined to comprise the timestamp corresponding to the target video, and defining a new recorded video with a longest time apart from the ignored videos as the target video.

11. A non-transitory computer readable storage medium, the non-transitory computer readable storage medium stores computer programs, and the computer programs are executed by at least one processor to implement the following steps:
  acquiring an instruction to apply time labeling, and labeling each recorded video with a timestamp based on the instruction of time labeling;
  generating first mark information based on a content of each recorded video and uploading the first mark information and the timestamp into a blockchain;
  generating second mark information based on a content of at least one to-be-checked video; the at least one to-be-check video is one or all of the recorded videos;
  determining whether the first mark information is the same as the second mark information;
  finding the to-be-checked video to be undistorted and authentic when the first mark information is determined to be the same as the second mark information;
  finding the to-be-checked video to be non-authentic when the first mark information is determined to be different from the second mark information;
  determining whether the blockchain comprises the same timestamp as the timestamp of the to-be-checked video; and
  labeling the to-be-checked video as an important video when the blockchain is determined to comprise the same timestamp;
wherein the steps further comprise:
obtaining an instruction of playback;
determining whether the to-be-checked video is labeled as the important video;
playing back the to-be-checked video from a time point of the timestamp of the to-be-checked video when the to-be-checked video is determined to be labeled as the important video; and
playing back the to-be-checked from beginning when the to-be-checked video is determined to be labeled as a normal video.

12. The non-transitory computer readable storage medium of claim 11, wherein an identification document (ID) of the recorded video is uploaded while uploading the first mark information and the timestamp into the blockchain; the steps further comprise:
  searching for the same ID in the blockchain as the ID of the to-be-checked video; and
  obtaining the first mark information and the timestamp in the blockchain corresponding to the ID of the to-be-checked video.

13. The non-transitory computer readable storage medium of claim 11, wherein
deleting the recorded video with a longest time apart from ignored videos when a storing space of the recorded video is full.

14. The non-transitory computer readable storage medium of claim 13, wherein steps further comprise:
defining the recorded video with a longest time apart from the ignored videos as a target video;
determining whether the blockchain comprises a timestamp corresponding to the target video;
deleting the target video when the blockchain is determined to comprise a timestamp corresponding to the target video; and
defining the target video as the ignored video when the blockchain is determined to comprise the timestamp corresponding to the target video, and defining a new recorded video with a longest time apart from the ignored videos as the target video.

\* \* \* \* \*